United States Patent [19]

Swensrud et al.

[11] 4,380,362
[45] Apr. 19, 1983

[54] DIRECTLY COOLED BOLTED SERIES CONNECTION OF GENERATOR STATOR COILS

[75] Inventors: Roger L. Swensrud, Plum Borough; Dennis Pavlik, Murrysville; John J. DeLuca, Pittsburgh, all of Pa.

[73] Assignee: Westinghouse Electric Corp., Pittsburgh, Pa.

[21] Appl. No.: 256,634

[22] Filed: Apr. 23, 1981

[51] Int. Cl.³ .................................................. H01R 13/00
[52] U.S. Cl. .................................... 339/112 L; 339/15
[58] Field of Search ............ 339/15, 16, 112 R, 112 L, 339/117 R, 117 P; 310/54, 58, 59, 60, 71

[56] References Cited

U.S. PATENT DOCUMENTS 3,950,665 4/1976 Schneider et al. .................. 310/260
4,072,873 2/1978 Nottingham ........................... 310/71

FOREIGN PATENT DOCUMENTS 1303468 8/1962 France .................................. 310/54
55-2322 9/1980 Japan ................................... 310/54

Primary Examiner—Eugene F. Desmond
Assistant Examiner—David Pirlot
Attorney, Agent, or Firm—William D. Lanyi

[57] ABSTRACT

Apparatus for connecting two fluid cooled stator coils of a turbine generator electrically in series and hydraulically in parallel. A two piece combination is bolted together to securely fasten an interconnective bundle of leads in such a way as to permit assembly of the leads without interference with a nozzle used in the coolant circuit. The apparatus is utilized in pairs, one for each connected stator coil, and with one bundle of conductive leads disposed between and fastened by each of the pair of the present invention.

8 Claims, 4 Drawing Figures

DIRECTLY COOLED BOLTED SERIES CONNECTION OF GENERATOR STATOR COILS

BACKGROUND AND SUMMARY OF THE INVENTION

The present invention relates to an apparatus that provides a serial electrical connection between two fluid cooled conductors and, more particularly, to the electrical interconnection of adjacent liquid cooled stator coils in a turbine generator.

Typically, top and bottom stator coils disposed in different stator core slots are connected hydraulically in parallel and electrically in series. In order to provide the electrical connection between the adjacent termini of two coils, a plurality of conductive leads are used to traverse the distance between the two adjacent coil termini. Each coil that is to be connected to another coil's end must be equipped with an appropriate interconnective apparatus. This apparatus performs the dual functions of enabling the introduction of a fluid coolant into the coil and securely fastening one end of a bundle of conductive leads that connect the coil to another, adjacent coil. The adjacent coil is cooperatively associated with another similar apparatus that enables the introduction of fluid coolant into it and securely fastens the other end of the aforementioned bundle of connective leads. The two apparatus work individually to provide a fluid coolant inlet or outlet for their associated coils and conjunctively to fasten the bundle of conductive leads between them.

A present design of the connection apparatus comprises a nozzle connected to a box shaped plenum. Connected to the plenum's header cap is a four-sided ferrule structure having two opposing open sides. Extending into one open side of this structure, the bundle of interconnective conductive leads are wedged against two internal sides of this four-sided structure. All segments of this connective apparatus are conductive and generally rigid.

The present invention utilizes an L-shaped pressure plate that is bolted to an associated generally L-shaped device which has a fluid passage machined therethrough. The two most significant advantages of the present invention over prior methods are that the bundle of conductive leads can be securely clamped without requiring separate wedges and that the fluid nozzle is disposed in a matter than does not interfere with the assembly of conductive leads into the connective apparatus of the present invention.

BRIEF DESCRIPTION OF THE DRAWINGS

The advantages and application of the present invention will be more fully understood when considered in view of the following description of the preferred embodiment read in conjunction with the following figures, in which.

DESCRIPTION OF THE PREFERRED EMBODIMENT

The present invention relates to the electrical and hydraulic connection of two conductors which are electrically in series and hydraulically in parallel and, more particularly, to the connection of adjacent fluid cooled stator coils of a turbine generator.

Figure 1:
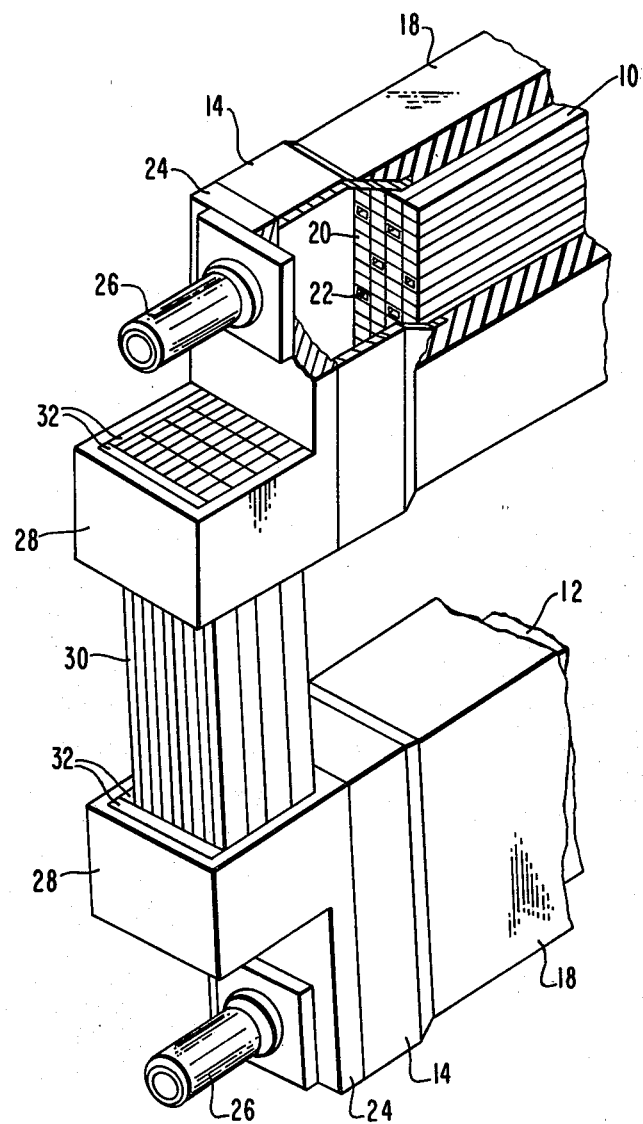
FIG. 1 is a sectioned view of an apparatus used to perform similar functions as the present invention.

A description of a typical former method of interconnecting fluid cooled stator coils will illustrate the advantages of the present invention. FIG. 1 depicts a typical method of connecting a top stator coil 10 to a bottom stator coil 12. One coolant plenum 14 is connected to the top coil 10 and another coolant plenum 14 is connected to the bottom coil 12. The header 14 serves the dual functions of forming a leak proof plenum chamber through which coolant passes either into or out of its associated stator coil 10 or 12 and providing an electrical connection to that stator coil. Each fluid cooled stator coil comprises a core of conductors surrounded with insulative material 18. This conductive core includes both solid 20 and hollow 22 strands. A coolant flows through the hollow 22 strands and removes heat from the stator coils.

Connected to each header 14 is a header cap 24 which has a hole therethrough into which a nozzle 26 is inserted and sealed thereto. The nozzle 26 allows coolant to be introduced into the plenum chamber of the header 14 from which it flows into the hollow strands 22 of the stator coils. A rectangular ferrule 28 is attached to or is part of the header cap 24. This ferrule 28 is four-sided with two opposing open sides.

Using two such combination devices with one connected to each of two adjacent stator coils, as shown in FIG. 1, a bundle of conductive leads 30 is disposed between the two devices with one end of the bundle 30 inserted into each rectangular ferrule 28. To fix the position of the bundle's end within the rectangular ferrule 28, wedges 32 are typically driven between bundle of conductive leads 30 and the internal wall surfaces of each rectangular ferrule 28. In order to assure proper electrical conductivity, wedges 32 are generally not applied adjacent to the internal wall surface which is proximate the header cap 24.

FIG. 1 and the above description illustrate some of the functional disadvantages of this apparatus and method of connecting adjacent fluid cooled stator coils. One obvious disadvantage is the need to wedge the conductive leads 30 in place which may result in inconsistent or nonuniform pressure on the strands of the bundle of conductive leads 30. Another disadvantage is that, during assembly of the conductive leads 30 into the rectangular ferrules 28, the individual strands of the bundle 30 must be threaded past the nozzle 26. This problem has been exacerbated by the tendency of the coil designs to become smaller due to the increased cooling efficiency of fluid cooled stator coils. As the size of the coil is reduced, the available area for the nozzle 26 and rectangular ferrule 28 suffers a corresponding reduction. The problem of inserting the final few strands of the conductive bundle 30 is further complicated by the fact that, due to the typical misalignment of the two associated rectangular ferrules 28 because of stator coil position, the strands must be bent to correct for this misalignment. One possible solution to this second disadvantage would be to position the rectangular ferrule 28 to the side of its associated nozzle 26 rather than below or above it as shown in FIG. 1. However, due to the fact that the stator coils 10 and 12 are generally not square in crosssection, this solution would require the connection apparatus to be bigger and require more material with an incumbent increase in cost and required assembly space. Positioning the ferrules 28 to the side would thus physically interfere with adjacent coils and their associated connection apparatus.

Figure 2:
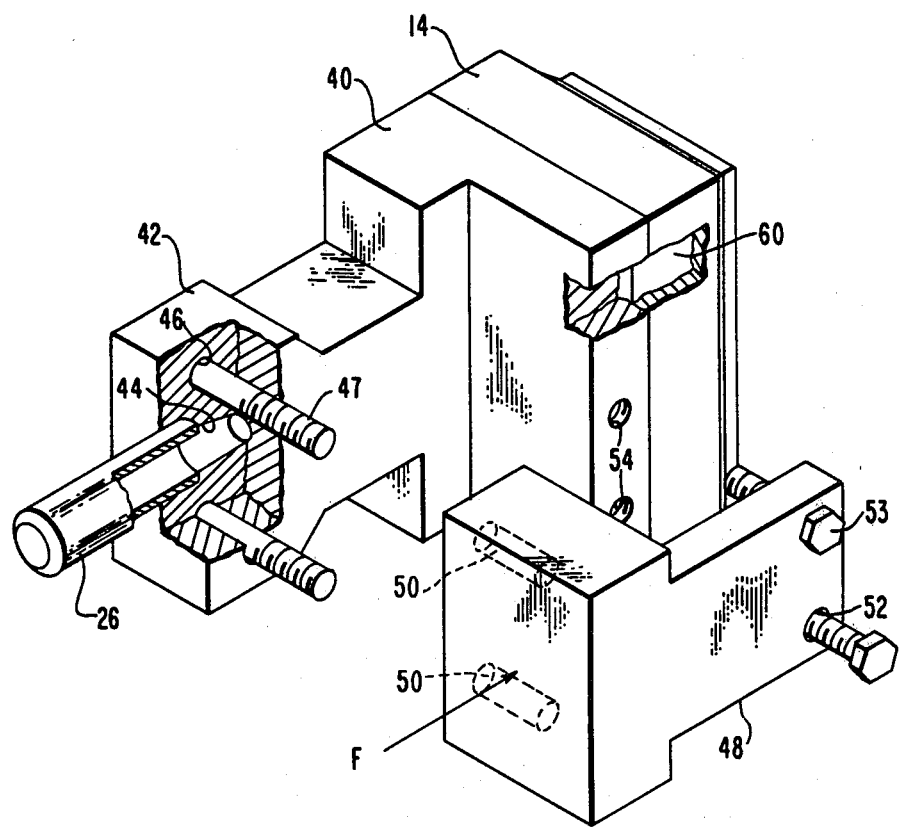
FIG. 2 is an illustrative view of the various components of the present invention.

The present invention avoids both of these disadvantages as illustrated in FIG. 2. It comprises two main parts that differ significantly from the apparatus of the former method described above. One is a generally L-shaped member comprising a header cap 40 segment, functionally similar to the former header cap 24, and an attached heat sink member 42 which provides both a clamping and a hydraulic function. This attached heat sink member 42 has a tubular hole 44 running through it which continues through the header cap 40 segment. One end of the tubular hole 44 terminates at the header cap 40 end of the generally L-shaped member. At the other end of the tubular hole 44, a nozzle 26 is connected to the attached heat sink member 42. The tubular hole 44 is in fluid communication with the coolant plenum 60 of a header 14 which provides further fluid communication between the nozzle 26 and the coolant plenum 60 permitting coolant to flow between the nozzle 26 and the conductive core of a stator coil (not shown) which is connectable to the header 14 in a manner similar to that illustrated in FIG. 1.

The attached heat sink member 42 has holes 46 therethrough that facilitate its connection to a generally L-shaped pressure plate 48. The pressure plate 48 has associated threaded holes 50 which allow it to be securely fastened to the attached heat sink member 42 by bolts 47 passing through its holes 46. The pressure plate 48 also has clearance holes 52 which are associated with threaded holes 54 in the header cap 40 segment of the present invention which allow the pressure plate 48 to be similarly securely fastened to it with bolts 53. The clearance holes 46 and 52 are elongated to allow a force F to be exerted upon the pressure plate 48 during the tightening of the bolts 47 and 53 which assures a secure fastening of one end of a bundle of conductive leads (not shown in FIG. 2). The combined utilization of the force F and the force of the bolts 47 and 53 during assembly provides secure mechanical and electrical contact in both directions, parallel and perpendicular to the bolts 47 and 53.

It should be apparent that when the pressure plate 48 is bolted to the other, L-shaped, member of the present invention, the two components combine to form a space between them that is generally rectangular in cross-section. It is into this space that one end of the bundle of conduction leads (reference numeral 30 of FIG. 1) is disposed. The dimensions of the pressure plate 48, header cap segment 40 and attached heat sink member 42 are chosen in such a way so as to provide a secure clamping force on the bundle of conductive leads (reference number 30 of FIG. 1) when the two components of the present invention are fastened together, as described above, using a plurality of bolts in cooperation with the elongated clearance holes 46 and 52 and threaded holes 50 and 54. It should be further apparent that the bundle of conductive leads are securely fastened without the use of wedges and that the bundle of conductive leads can be assembled in cooperation with the present invention without interference with the nozzle 26.

Figure 3A:
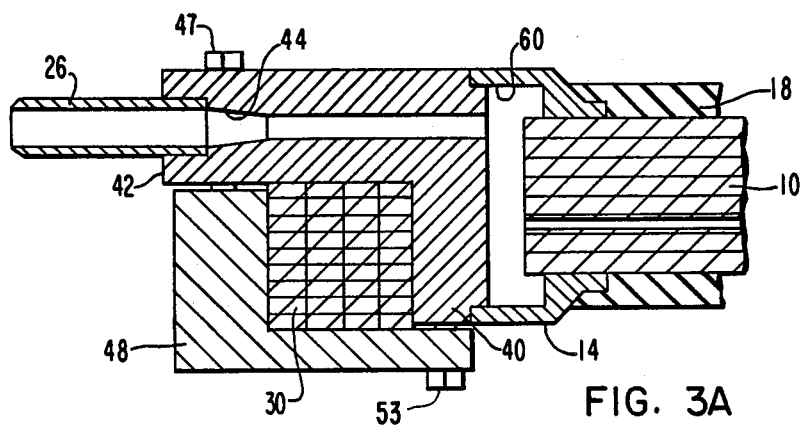
FIG. 3A depicts a top view of the present invention.
Figure 3B:
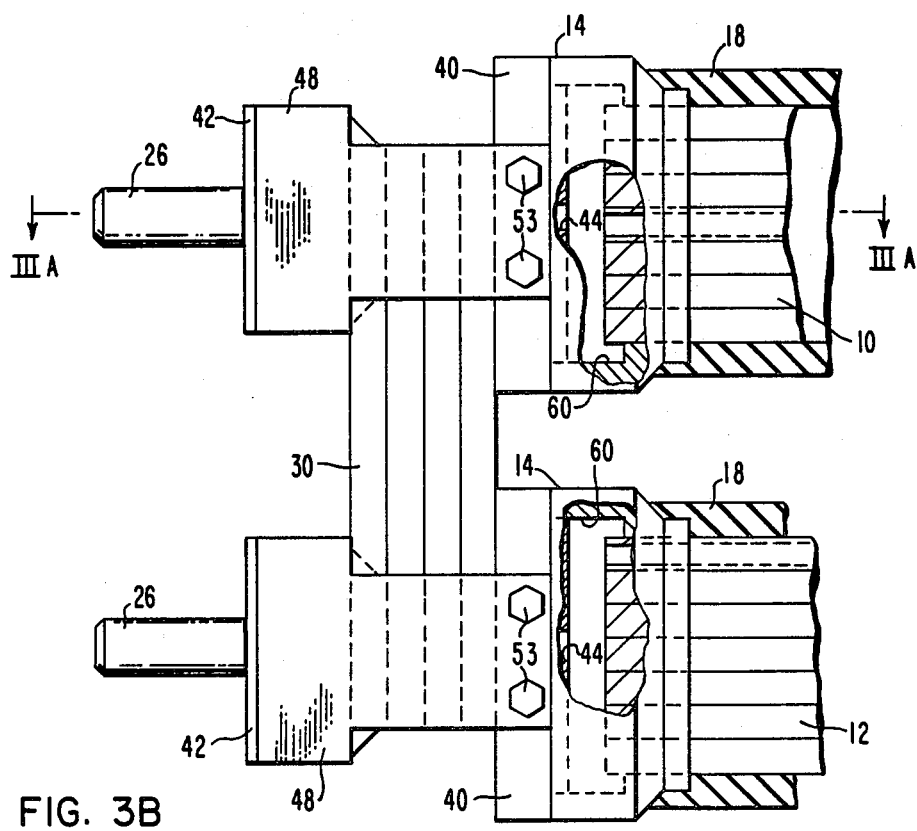
FIG. 3B depicts a side view of the present invention illustrating its arrangement for connecting two stator coils.

FIGS. 3A and 3B depict top (3A) and side (3B) views of the present invention associated with top 10 and bottom 12 stator coils of a turbine generator. A header 14 is attached to each coil in a manner that provides electrical communication between the conductive core of the stator coil and the header 14. The juncture between the header 14 and its associated stator coil, 10 or 12, is covered with an insulative integral bracing sleeve 18. The coils extend into the coolant plenum 60 of their associated header 14. Securely attached to the coolant plenum 14 is the header cap 40 portion of the present invention with the attached heat sink member 42 extending from the header cap 40 in a direction away from the associated stator coil 10 or 12. The tubular hole 44 provides fluid communication between the nozzle 26 and coolant plenum 60 of the header 114 which permits coolant fluid to pass into or out of the fluid cooled stator coils, 10 or 12.

Securely fastened to the header cap 40 and attached heat sink member 42 segments of the generally L-shaped member, with bolts 47 and 53, is the pressure plate 48. Between these two major segments of the present invention, an end of the bundle of conductive leads 30 is disposed within the rectangular cross-sectional space formed by the association of these two major segments. By tightening bolts 47 and 53, a secure clamping force can be exerted on the bundle of conductive leads 30.

Shown in FIG. 3B are two of the present invention used in conjunction with each other with the bundle of conductive leads 30 disposed therebetween. One is clamped to one end of the conductive leads 30 and the other is clamped to the remaining end of the conductive leads 30. The present invention is expected to be used in pairs as shown in FIG. 3B, but should not be construed to be so limited.

It should be apparent to one skilled in the art that the present invention provides electrical communication between two stator coils in an electrically serial manner while allowing the two stator coils to be connected hydraulically either serially or in parallel. It should be further apparent that the present invention provides a means of securely fastening an interconnective conductive lead without the use of shims or wedges while allowing for the assembly of the conductive leads to the present invention without interference of the fluid nozzle.

While the present invention has herein been described in particular detail as being applied to stator coils of a turbine generator, it should be understood that it could also be applied to other applications requiring two conductors to be connected electrically in series and either hydraulically parallel or in series. It should also be understood that although the present invention has been described as being used in pairs, it is not so limited and, in circumstances that warrant it, could be used singly as in situations where one conductor is fluid cooled and the other is not.

What we claim is:
1. A fluid cooled electrical connection apparatus, comprising:
a conductive first member, said first member having a tubular hole therethrough, said tubular hole having a first and a second terminus;
a nozzle, said nozzle having a first and a second terminus, said first nozzle terminus being connected to said first terminus of said tubular hole, said nozzle being in fluid communication with said tubular hole;

a second member, said second member being connectable to said first member, said second member being generally L-shaped;

a first conductor, said first conductor having one terminus disposed between said first and second member;

means for causing said first and second members to be pulled together and to secure said first conductor between said first and second member;

a second conductor, said second conductor having fluid channels therethrough said second conductor being connected to said first member, said fluid channels of said second conductor being in fluid communication with said second terminus of said tubular hole, whereby said fluid channels of said second conductor are in fluid communication with said nozzle; and whereby said second conductor is in electrical communication with said first conductor.

2. The apparatus of claim 1, wherein said means for causing said first and second members to be pulled together is a plurality of threaded bolts.

3. The apparatus of claim 1, wherein said first member is generally L-shaped.

4. A dynamoelectric machine, comprising:
a plurality of stator coils, each of said stator coils having two termini and having a plurality of coolant channels running therethrough;

a first means for conducting a fluid into a preselected terminus of a first preselected one of said plurality of stator coils;

a second means for conducting a fluid into a preselected terminus of a second preselected one of said plurality of stator coils;

a first pressure plate, said first pressure plate being connectable to said first fluid conducting means, said first pressure plate being generally L-shaped;

a second pressure plate, said second pressure plate being connectable to said second fluid conducting means, said second pressure plate being generally L-shaped;

an electrically conductive lead, said electrically conductive lead having first and second termini, said first terminus of said electrically conductive lead being disposed between said first fluid conducting means and said first pressure plate, said second terminus of said electrically conductive lead being disposed between said second fluid conducting means and said second pressure plate;

means for tightening said first pressure plate and said first fluid conducting means against said first terminus of said electrically conductive lead;

means for tightening said second pressure plate and said second fluid conducting means against said second terminus of said electrically conducting lead; and whereby said first preselected one of said plurality of stator coils is in electrical communication with said second preselected one of said plurality of stator coils.

5. The dynamoelectric machine of claim 4, wherein:
said first fluid conducting means comprises a conductive member with a tubular hole therethrough and a nozzle connected to a preselected terminus of said tubular hole, said nozzle being in fluid communication with said first preselected one of said plurality of said stator coils.

6. The dynamoelectric machine of claim 4, wherein said second fluid conducting means comprises a conductive member with a tubular hole therethrough and a nozzle connected to a preselected terminus of said tubular hole, said nozzle being in fluid communication with said second preselected one of said plurality of said stator coils.

7. An apparatus for connecting two turbine generator stator coils together, comprising:
a conductive header, said header being connectable to a preselected one of said two stator coils, said header having a plenum chamber therein;

a header cap, said header cap being connected to said header, said header cap having a hole therethrough, said hole being in fluid communication with said plenum chamber;

a conductive heat sink, said heat sink having a tubular hole therethrough, said heat sink being connected to said header cap with said tubular hole being in fluid communication with said header cap hole;

a nozzle, said nozzle being connected to said heat sink with said nozzle being in fluid communication with said tubular hole;

a pressure plate, said pressure plate being connectable to said heat sink and said header cap;

a conductive lead, a first preselected terminus of said conductive lead being disposed between said heat sink and said pressure plate;

whereby said nozzle is in fluid communication with said header; and whereby said conductive lead is in electrical communication with said header.

8. The apparatus of claim 7, further comprising:
a second apparatus as set forth in claim 7;

a first stator coil, said first stator coil being connected to said header of a first apparatus as set forth in claim 7;

a second stator coil, said second stator coil being connected to said header of said second apparatus as set forth in claim 7;

wherein a second preselected terminus of said conductive lead is disposed between said heat sink and said pressure plate of said second apparatus; and whereby said first and second stator coils are in electrical communication with each other.

* * * * *